(12) United States Patent
Yoshida

(10) Patent No.: US 8,634,093 B2
(45) Date of Patent: Jan. 21, 2014

(54) IMAGE PROCESSING APPARATUS CAPABLE OF RECORDING USER INFORMATION INTO EXTERNAL RECORDING MEDIUM, AND CONTROL METHOD AND RECORDING MEDIUM THEREFOR

(75) Inventor: Hiroyoshi Yoshida, Tokyo (JP)

(73) Assignee: Canon Kabushiki Kaisha (JP)

(*) Notice: Subject to any disclaimer, the term of this patent is extended or adjusted under 35 U.S.C. 154(b) by 354 days.

(21) Appl. No.: 13/194,232

(22) Filed: Jul. 29, 2011

(65) Prior Publication Data
US 2012/0026533 A1    Feb. 2, 2012

(30) Foreign Application Priority Data

Jul. 30, 2010    (JP) ................... 2010-172198

(51) Int. Cl.
*G06F 3/12* (2006.01)
*G06K 15/00* (2006.01)

(52) U.S. Cl.
USPC ................ 358/1.15; 358/1.14; 358/1.16

(58) Field of Classification Search
None
See application file for complete search history.

(56) References Cited

U.S. PATENT DOCUMENTS

| | | | |
|---|---|---|---|
| 8,055,682 B1* | 11/2011 | Boxmeyer et al. | 707/802 |
| 2002/0135816 A1* | 9/2002 | Ohwa | 358/474 |
| 2006/0152761 A1* | 7/2006 | Sergey | 358/1.16 |
| 2007/0097433 A1* | 5/2007 | Teranishi et al. | 358/1.16 |
| 2008/0243931 A1* | 10/2008 | Asai | 707/104.1 |
| 2011/0060759 A1* | 3/2011 | Fienblit et al. | 707/770 |
| 2012/0169463 A1* | 7/2012 | Shin et al. | 340/5.82 |

FOREIGN PATENT DOCUMENTS

| | | | | |
|---|---|---|---|---|
| EP | 1113377 | * | 7/2001 | ............. G06F 17/60 |
| JP | 11-194986 A | | 7/1999 | |
| JP | 2003331290 | * | 11/2003 | |
| JP | 2007-028019 A | | 2/2007 | |
| JP | 2007233796 | * | 9/2007 | |
| JP | 2007234054 | * | 9/2007 | |
| JP | 2008146342 | * | 6/2008 | |

* cited by examiner

*Primary Examiner* — Fan Zhang
(74) *Attorney, Agent, or Firm* — Rossi, Kimms & McDowell LLP

(57) ABSTRACT

An image processing apparatus capable of recording user information into an external recording medium, while preventing an occurrence of a security problem. The image processing apparatus generates user information about an image processing job, and determines according to predetermined recording medium categories whether security information can be stored into an external recording medium in a case where the user information is recorded into the external recording medium. When determining that the security information cannot be stored into the external recording medium, the image processing apparatus removes predetermined security information from the user information and records the resultant information into the external recording medium.

11 Claims, 24 Drawing Sheets

| STORAGE UNIT | CATEGORY |
|---|---|
| OWN APPARATUS | SECURE |
| APPLIANCES IN SAME ROUTE | SECURE |
| APPLIANCES ON INTRANET | SECURE |
| USB STORAGE MEDIA | GENERAL |
| APPLIANCES ON INTERNET | PROHIBITION |

FIG.6

| ITEM | SETTING VALUE |
|---|---|
| NUMBER OF PRINT COPIES | 10 |
| MAGNIFICATION | 100 |
| REDUCTION LAYOUT | NON |
| DOUBLE-SIDED | DOUBLE-SIDED PRINTING |
| FINISHING | STAPLING: UPPER LEFT |
| DATA SERVER | ¥¥security-server.com¥001 |
| FILE NAME | PRODUCT DEVELOPMENT ROADMAP.xls |
| USER NAME | yoshida |
| PASSWORD | password |
| TRANSMISSION DESTINATION | NON |
| COLOR ADJUSTMENT | -1, 0, +1, 2 |
| PRINTER MAGNIFICATION FINE ADJUSTMENT | 0.1 |

FIG.7

YOSHIDA'S JOB LIST

| DATE | TYPE | JOB NAME | RESULT |
|---|---|---|---|
| Dec-24 | PRINT | PRODUCT DEVELOPMENT ROADMAP.xls | OK |
| Dec-25 | PRINT | PRODUCT DEVELOPMENT ROADMAP.xls | OK |
| Jan-07 | COPY | | OK |
| Jan-07 | PRINT | CUSTOMER INFORMATION.xls | OK |
| Jan-07 | FAX | 03-1234-5678 | OK |
| Feb-05 | PRINT | PRODUCT DEVELOPMENT ROADMAP.xls | OK |

[DETAIL INFORMATION]   [EXECUTE]   [CLOSE]

*FIG.11*

| STORAGE UNIT | CATEGORY |
|---|---|
| OWN APPARATUS | SECURE |
| APPLIANCES IN SAME ROUTE | SECURE |
| APPLIANCES ON INTRANET | SECURE |
| USB STORAGE MEDIA | GENERAL |
| APPLIANCES ON INTERNET | PROHIBITION |

FIG.12

| ITEM | INFORMATION TYPE | SETTING ITEM | USER INFORMATION | CATEGORY |
|---|---|---|---|---|
| JOB DEFAULT SETTINGS | SETTING VALUE INFORMATION | NUMBER OF PRINT COPIES | ○ | GENERAL |
| | | MAGNIFICATION | ○ | GENERAL |
| | | REDUCTION LAYOUT | ○ | GENERAL |
| | | DOUBLE-SIDED | ○ | GENERAL |
| | | FINISHING | ○ | GENERAL |
| | | DATA SERVER | ○ | SECURE |
| | | FILE NAME | ○ | SECURE |
| | | USER NAME | ○ | SECURE |
| | | PASSWORD | ○ | CONFIDENTIAL |
| | | TRANSMISSION DESTINATION | ○ | SECURE |
| | | COLOR ADJUSTMENT (C,M,Y,K) | × | GENERAL |
| | | PRINTER MAGNIFICATION FINE ADJUSTMENT | × | GENERAL |
| FREQUENTLY-USED JOB SETTINGS | SETTING VALUE INFORMATION | DITTO | | |
| JOB HISTORY | SETTING VALUE INFORMATION | DITTO | | |
| ADDRESS BOOK | ADDRESS BOOK INFORMATION | NAME | × | SECURE |
| | | PROTOCOL | × | SECURE |
| | | ADDRESS | × | SECURE |
| | | SUB-ADDRESS | × | SECURE |
| | | ATTRIBUTE INFORMATION | × | SECURE |
| SCREEN CUSTOMIZATION SETTINGS | SCREEN CUSTOMIZATION INFORMATION | USER NAME | × | GENERAL |
| | | COMMENT INFORMATION | × | GENERAL |
| | | SCREEN BACKGROUND IMAGE | | GENERAL |
| | | MENU SCREEN ARRANGEMENT INFORMATION | × | GENERAL |

*FIG.13*

| FILE NAME | REGISTERED VALUE |
|---|---|
| . . . | . . . |
| ¥yoshida¥0315467-1 | ¥¥security-server.com¥001 |
| ¥yoshida¥0315467-2 | PRODUCT DEVELOPMENT ROADMAP.xls |
| ¥yoshida¥0315467-3 | yoshida |
| . . . | . . . |

FIG.14

| ITEM | SETTING VALUE |
|---|---|
| NUMBER OF PRINT COPIES | 10 |
| MAGNIFICATION | 100 |
| REDUCTION LAYOUT | NON |
| DOUBLE-SIDED | DOUBLE-SIDED PRINTING |
| FINISHING | STAPLING: UPPER LEFT |
| DATA SERVER | ¥¥personalized-data-server¥yoshida¥0315467-1 |
| FILE NAME | ¥¥personalized-data-server¥yoshida¥0315467-2 |
| USER NAME | ¥¥personalized-data-server¥yoshida¥0315467-3 |
| PASSWORD | |
| TRANSMISSION DESTINATION | NON |

FIG.15

| ITEM | DATA ENTRY | CREATION DATE | CREATION APPARATUS |
|---|---|---|---|
| JOB DEFAULT SETTINGS | .¥default¥yoshida0000 | 2009/12/09 | 192.168.003.123 |
| FREQUENTLY-USED JOB SETTINGS | .¥jobset¥yoshida0000 | 2009/12/09 | 192.168.003.123 |
| FREQUENTLY-USED JOB SETTINGS | .¥jobset¥yoshida0001 | 2009/12/09 | 192.168.003.123 |
| FREQUENTLY-USED JOB SETTINGS | .¥jobset¥yoshida0002 | 2009/12/09 | 192.168.003.123 |
| SCREEN CUSTOMIZATION SETTINGS | .¥custom¥yoshida0000 | 2009/12/09 | 192.168.003.123 |
| JOB HISTORY | .¥joblist¥yoshida0000 | 2009/12/24 | 192.168.003.123 |
| JOB HISTORY | .¥joblist¥yoshida0001 | 2009/12/25 | 192.168.003.123 |
| JOB HISTORY | .¥joblist¥yoshida0002 | 2009/01/07 | 192.168.000.200 |
| JOB HISTORY | .¥joblist¥yoshida0003 | 2009/01/07 | 192.168.003.123 |
| FREQUENTLY-USED JOB SETTINGS | .¥jobset¥yoshida0004 | 2009/01/07 | 192.168.003.123 |
| JOB HISTORY | .¥joblist¥yoshida0005 | 2009/02/05 | 192.168.000.200 |
| JOB HISTORY | .¥joblist¥yoshida0006 | 2009/02/05 | 192.168.003.123 |

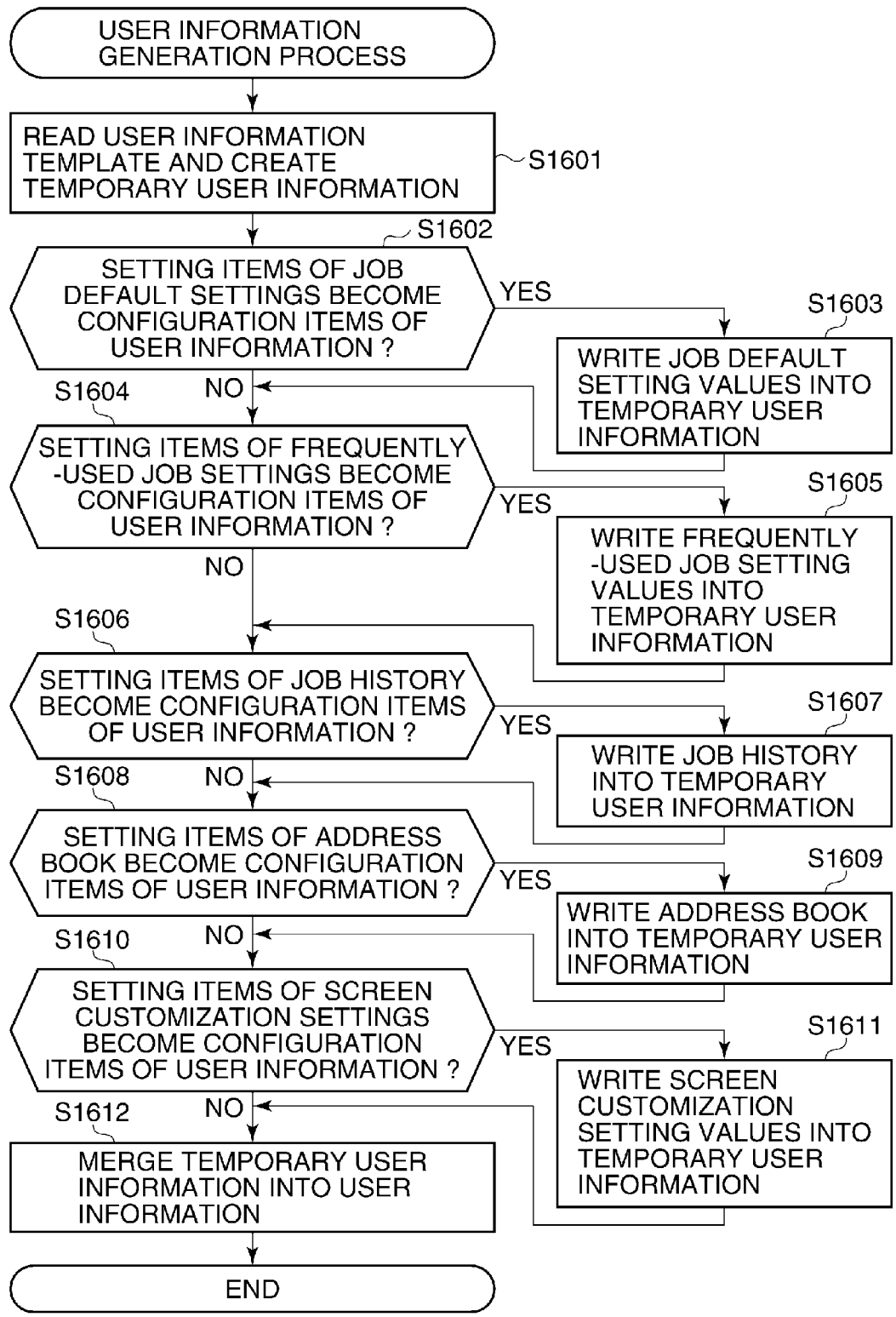

FIG.18

YOSHIDA'S JOB LIST

| DATE | TYPE | JOB NAME | RESULT |
|---|---|---|---|
| Dec-24 | PRINT | ********** | OK |
| Dec-25 | PRINT | ********** | OK |
| Jan-07 | COPY | ********** | OK |
| Jan-07 | PRINT | ********** | OK |
| Jan-07 | FAX | ********** | OK |
| Feb-05 | PRINT | ********** | OK |
| | | | |
| | | | |

[DETAIL INFORMATION] [EXECUTE] [CLOSE]

FIG.19

YOSHIDA'S JOB LIST

| DATE | TYPE | JOB NAME | RESULT |
|---|---|---|---|
| Dec-24 | PRINT | ********** | OK |
| Dec-25 | | | OK |
| Jan-07 | | | OK |
| Jan-07 | | | OK |
| Jan-07 | | | OK |
| Feb-05 | | | OK |

THERE IS UNREPRODUCIBLE INFORMATION.
DO YOU WANT TO MAKE LOADING ?

[Cancel]  [OK]

[DETAIL INFORMATION]  [EXECUTE]  [CLOSE]

*FIG.21*

| ITEM | SETTING VALUE |
|---|---|
| NUMBER OF PRINT COPIES | 10 |
| MAGNIFICATION | 100 |
| REDUCTION LAYOUT | NON |
| DOUBLE-SIDED | DOUBLE-SIDED PRINTING |
| FINISHING | STAPLING: UPPER LEFT |
| DATA SERVER | NON |
| FILE NAME | NON |
| USER NAME | NON |
| PASSWORD | |
| TRANSMISSION DESTINATION | NON |

FIG.24

| ITEM | INFORMATION TYPE | SETTING ITEM | USER INFORMATION | CATEGORY |
|---|---|---|---|---|
| JOB DEFAULT SETTINGS | SETTING VALUE INFORMATION | NUMBER OF PRINT COPIES | ○ | GENERAL |
| | | MAGNIFICATION | ○ | GENERAL |
| | | REDUCTION LAYOUT | ○ | GENERAL |
| | | DOUBLE-SIDED | ○ | GENERAL |
| | | FINISHING | ○ | GENERAL |
| | | DATA SERVER | ○→× | SECURE |
| | | FILE NAME | ○→× | SECURE |
| | | USER NAME | ○→× | SECURE |
| | | PASSWORD | ○ | CONFIDENTIAL |
| | | TRANSMISSION DESTINATION | ○→× | SECURE |
| | | COLOR ADJUSTMENT (C,M,Y,K) | × | GENERAL |
| | | PRINTER MAGNIFICATION FINE ADJUSTMENT | × | GENERAL |
| FREQUENTLY-USED JOB SETTINGS | SETTING VALUE INFORMATION | DITTO | | |
| JOB HISTORY | SETTING VALUE INFORMATION | DITTO | | |
| ADDRESS BOOK | ADDRESS BOOK INFORMATION | NAME | × | SECURE |
| | | PROTOCOL | × | SECURE |
| | | ADDRESS | × | SECURE |
| | | SUB-ADDRESS | × | SECURE |
| | | ATTRIBUTE INFORMATION | × | SECURE |
| SCREEN CUSTOMIZATION SETTINGS | SCREEN CUSTOMIZATION INFORMATION | USER NAME | × | GENERAL |
| | | COMMENT INFORMATION | × | GENERAL |
| | | SCREEN BACKGROUND IMAGE | | |
| | | MENU SCREEN ARRANGEMENT INFORMATION | × | GENERAL |

IMAGE PROCESSING APPARATUS CAPABLE OF RECORDING USER INFORMATION INTO EXTERNAL RECORDING MEDIUM, AND CONTROL METHOD AND RECORDING MEDIUM THEREFOR

BACKGROUND OF THE INVENTION

1. Field of the Invention

The present invention relates to an image processing apparatus capable of recording user information into an external recording medium, and a control method and a recording medium therefor.

2. Description of the Related Art

There is an image processing apparatus that records user information (such as customizing information or use history information) and reproduces as required the recorded user information. Such image processing apparatus can be used in a use environment represented by the user information.

Also is known a management apparatus that records job histories in network-connected devices (such as image processing apparatuses) into an external apparatus (such as a server). The management apparatus enables each device to receive a job history in another device from the external apparatus and use the received job history (see, for example, Japanese Laid-open Patent Publication No. 2007-28019).

Further is known a management system that includes a management server for collectively managing, in the form of setting data files, setting data of resource devices (such as multi-function peripherals) connected to a network, thereby improving the efficiency of a network system (see, for example, Japanese Laid-open Patent Publication No. 11-194986).

With the above-described image processing apparatus or under the above-described network environment, it is possible to record and reproduce user information such as job histories or setting data. Thus, states of device use by individual users can be learned and device use environments can be improved.

However, a device other than image processing apparatuses recorded with user information or other than devices operable under the network environment cannot acquire and reproduce user information, resulting in a low device usability.

On the other hand, by using a portable medium or other external recording medium stored with the user information, user information can be reproduced without regard to what device is used by a user, whereby the device usability can be prevented from being lowered. However, there is a fear that security information is leaked, if the portable medium recorded with user information including security information is taken out.

SUMMARY OF THE INVENTION

The present invention provides an image processing apparatus capable of recording user information into an external recording medium, while preventing an occurrence of a security problem, and a control method and a recording medium therefor.

According to one aspect of this invention, there is provided an image processing apparatus that performs an image processing job in which predetermined image processing is performed on an input image and a resultant image is output as an output image, which comprises a user information generation unit configured to generate user information about the image processing job, a first determination unit configured to determine according to predetermined recording medium categories whether security information can be stored into an external recording medium in a case where the user information is recorded into the external recording medium, and a user information securing unit configured, in a case where it is determined by the first determination unit that the security information cannot be stored into the external recording medium, to record into the external recording medium the user information from which predetermined security information is removed.

With this invention, it is possible to record, into an external recording medium, user information that can originally be recorded and reproduced only in a network environment to which the image processing apparatus is connected, while preventing security information from being leaked, thereby improving the usability of the image processing apparatus.

Further features of the present invention will become apparent from the following description of exemplary embodiments with reference to the attached drawings.

BRIEF DESCRIPTION OF THE DRAWINGS

FIG. 6 is a view showing an example of a print job setting table;

FIG. 7 is a view showing and example of a job history list;

FIG. 11 is a view showing an example of a category table showing a correspondence between storage units and category levels of information that can be stored into the storage units;

FIG. 12 is a view showing an example of a user information template used for security information determination in the user information securing process shown in FIG. 10;

FIG. 13 is a view showing an example of files created based on security information extracted from user information;

FIG. 14 is a view showing an example of user information corrected according to the files shown in FIG. 13;

FIG. 15 is a view showing an example of user information stored in an HDD shown in FIG. 1;

FIG. 16 is a flowchart showing an example of a user information generation process performed by the MFP;

FIG. 18 is a view showing an example of a job history list obtained as a result of execution of print jobs in a stand alone environment;

FIG. 19 is a view showing an example of a message displayed when a job is selected by a user from the job history list shown in FIG. 18;

FIG. 21 is a view showing an example of the user information after the user information securing process shown in FIG. 20 is performed;

FIG. 24 is a view showing an example of a user information template used in the login-related process shown in FIG. 23.

DESCRIPTION OF THE EMBODIMENTS

The present invention will now be described in detail below with reference to the drawings showing preferred embodiments thereof.
(First Embodiment)

Figure 1:
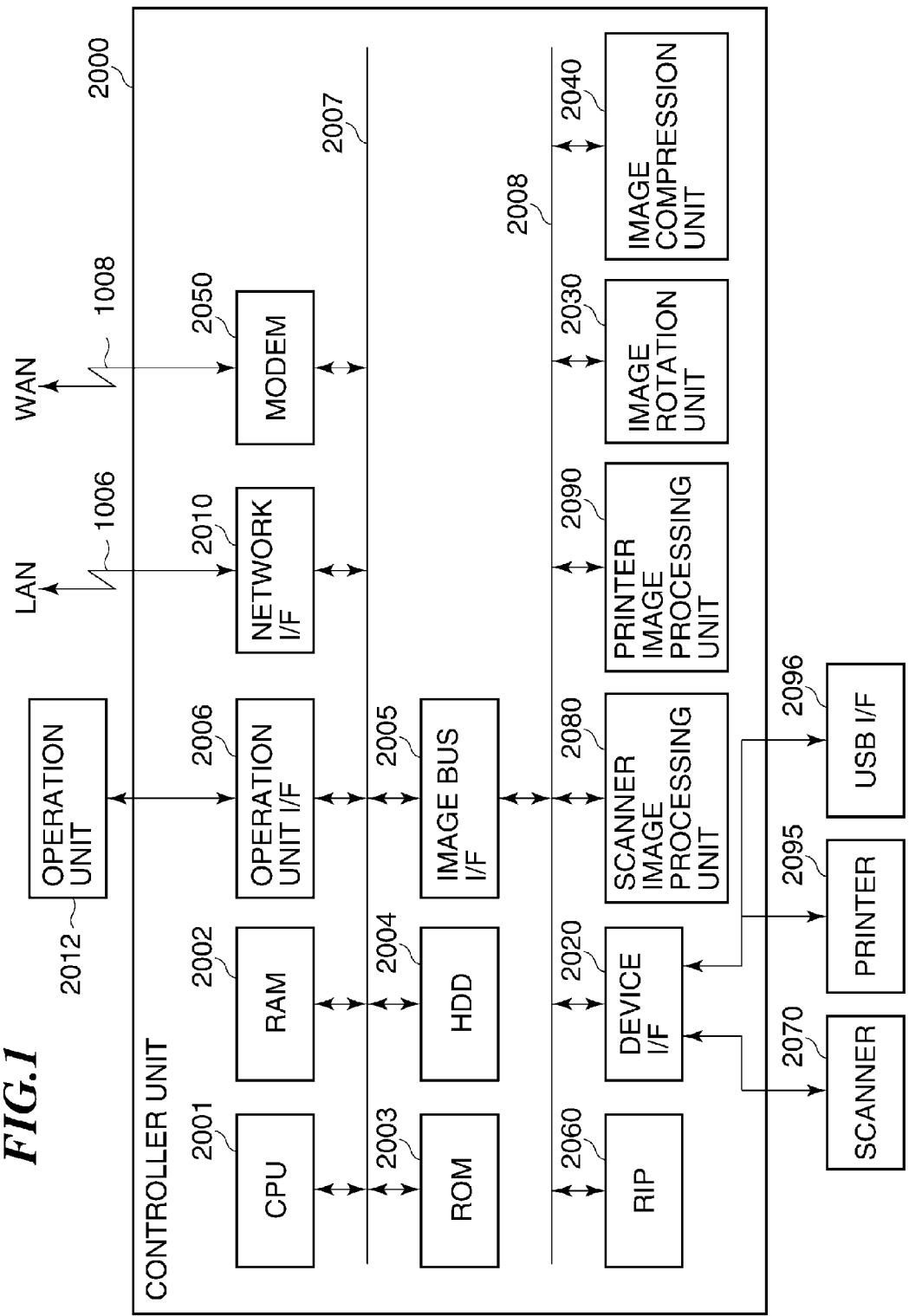
FIG. 1 is a block diagram showing an example of a multi-function printer (MFP), which is an image processing apparatus according to embodiments of this invention.

FIG. 1 shows in block diagram an example of a multi-function printer (MFP), which is an image processing apparatus according to embodiments of this invention.

The MFP shown in FIG. 1 performs, e.g., an image processing job in which predetermined image processing is performed on an input image and a resultant image is output as an output image.

The MFP includes a controller unit 2000 to which are connected a scanner 2070 (image input device), a printer 2095 (image output device), and an operation unit 2012.

The controller unit 2000 controls a copy function for printing by a printer 2095 image data read by the scanner 2070. The controller unit 2000 connected to a LAN 1006 and a public line (WAN) 1008 controls input and output of image information and device information through the LAN 1006 or the WAN 1008.

The controller unit 2000 includes a CPU 2001 that executes a boot program stored in a ROM 2003 to start up an operation system (OS) on which the CPU 2001 executes an application program stored in an HDD (hard disk drive) 2004, thereby performing various processing.

A RAM 2002 provides a work area used by the CPU 2001 and provides an image memory that temporarily stores image data. The HDD 2004 stores the application program and image data.

An operation unit I/F (interface) 2006, network I/F 2010, modem 2050, and image bus I/F 2005 as well as the RAM 2002 and ROM 2003 are connected to the CPU 2001 through a system bus 2007.

The operation unit I/F 2006 provides an interface with an operation unit 2012 having a display device and outputs to the operation unit 2012 image data to be displayed on the display device. The operation unit I/F 2006 transmits to the CPU 2001 information (commands) input through the operation unit 2012 by a user.

The network I/F 2010 connected to the LAN 1006 inputs and outputs information from and to external apparatuses on the LAN 1006. The modem 2050 inputs and outputs information through the WAN 1008 to which the modem 2050 is connected.

The image bus I/F 2005, which is a bus bridge for data format conversion, provides an interface between the system bus 2007 and an image bus 2008 that transfers image data at a high speed. The image bus 2008 is implemented by a PCI (peripheral components interconnect) bus or an IEEE 1394 bus.

Connected to the image bus 2008 are a raster image processor (hereinafter, referred to as the RIP) 2060, device I/F 2020, scanner image processing unit 2080, printer image processing unit 2090, image rotation unit 2030, and image compression unit 2040.

The RIP 2060 is a processor for developing a PDL (page description language) code into a bitmap image. The device I/F 2020 to which are connected the scanner 2070 and the printer 2095 performs image data conversion.

The scanner image processing unit 2080 performs correction, modification, and editing of input image data. The printer image processing unit 2090 performs correction, resolution conversion, etc. of print output image data according to characteristics of the printer 2095. The image rotation unit 2030 rotates image data.

The image compression unit 2040 compresses multi-valued image data into JPEG (joint photographic experts group) data, compresses binary image data into JBIG (joint bi-level image experts group) data, MMR (modified modified read) data, MH (modified huffman) data, or other data, and expands these data.

The USB I/F 2096 communicates with a portable medium (more generally, an external recording medium) such as a USB memory or an IC card, the USB memory (not shown) being connected to a USB connection port of the MFP and the IC card (not shown) being inserted into a IC card reader (not shown) connected to the USB I/F 2096. Image data read by the scanner 2070 is subjected to predetermined processing by the scanner image processing unit 2080, and then stored into the USB memory or the IC card through the USB I/F 2096.

The USB I/F 2096 reads image data stored in the USB memory or the IC card, and the image data read therefrom is converted into printable image data by the printer image processing unit 2090 and then printed by the printer 2095.

Figure 2:
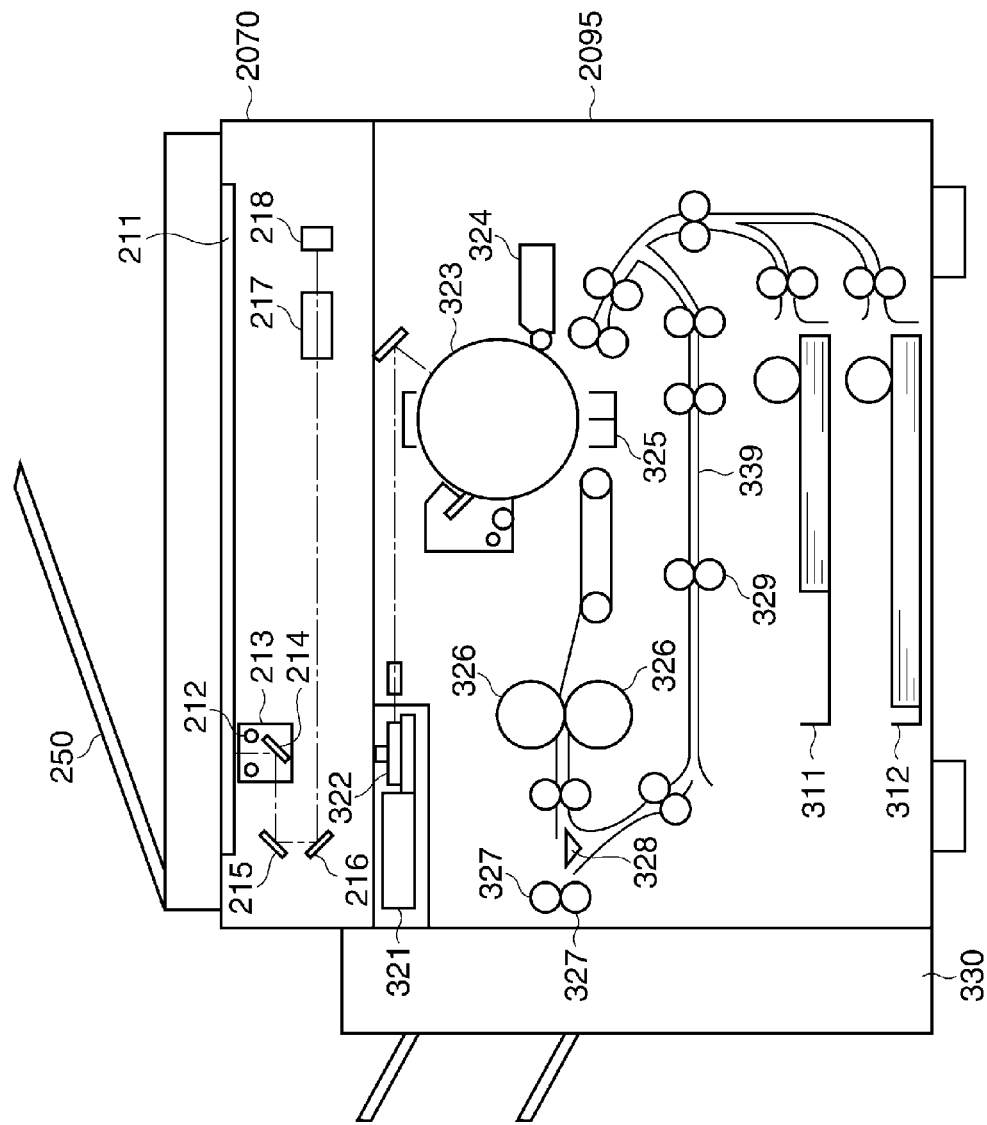
FIG. 2 is aside section view showing the hardware structures of a scanner and a printer shown in FIG. 1.

FIG. 2 shows the hardware structures of the scanner 2070 and the printer 2095 in side section view.

Referring to FIGS. 1 and 2, the scanner 2070 and the printer 2095 are constructed integrally with each other. The scanner 2070 is mounted with an original feeding unit 250 that feeds originals one by one onto a platen glass 211. After each completion of an original reading operation, the original feeding unit 250 discharges the original from the platen glass 211 to a discharge tray (not shown).

When an original is fed onto the platen glass 211, the scanner 2070 lights a lamp 212 and starts a moving unit 213 to move. With the movement of the moving unit 213, read scanning is performed on the original placed on the platen glass 211. During the read scanning, reflection light from the original is incident into a CCD image sensor (hereinafter, referred to as the CCD) 218 through mirrors 214 to 216 and a lens 217, and an image of the original is formed on an image pickup surface of the CCD 218. The CCD 218 converts the image formed on the image pickup surface into an electrical signal, which is then subjected to predetermined processing and input into a control unit (not shown).

The printer 2095 has a laser driver 321 that drives and controls a laser light emitter 322 according to image data input from the control unit, whereby laser light is emitted from the laser light emitter 322 according to the image data. The laser light is irradiated onto and scanned across the photosensitive drum 323.

With the laser light irradiation, an electrostatic latent image is formed on the photosensitive drum 323. The electrostatic latent image is developed by toner supplied from a developing device 324 into a toner image. In synchronism with a laser light irradiation timing, a recording sheet is fed from a cassette 311 or 312 through a conveyance path into between the photosensitive drum 323 and a transfer device 325, and the toner image formed on the drum 323 is transferred onto the recording sheet by the transfer device 325.

The recording sheet transferred with the toner image is conveyed by a conveyance belt to a fixing roller pair (heating roller and pressurizing roller) 326 by which the recording sheet is heated and pressurized, whereby the toner image on the recording sheet is fixed to the sheet. The recording sheet is then discharged by a sheet discharge roller pair 327 to a sheet discharge unit 330. The sheet discharge unit 330 is implemented by a sheet processing unit, which is capable of performing post-processing such as sorting and stapling.

In a double-sided recording mode, the sheet discharge roller pair 327 is rotated reversely after a recording sheet is conveyed to the sheet discharge roller pair 327, whereby the recording sheet is supplied by a flapper 328 to a sheet refeeding conveyance path 339. In synchronism with a laser light irradiation timing, the recording sheet is refed by a conveyance roller 329 into between the photosensitive drum 323 and the transfer device 325, and a toner image is transferred to a rear surface of the recording sheet.

Figure 3:
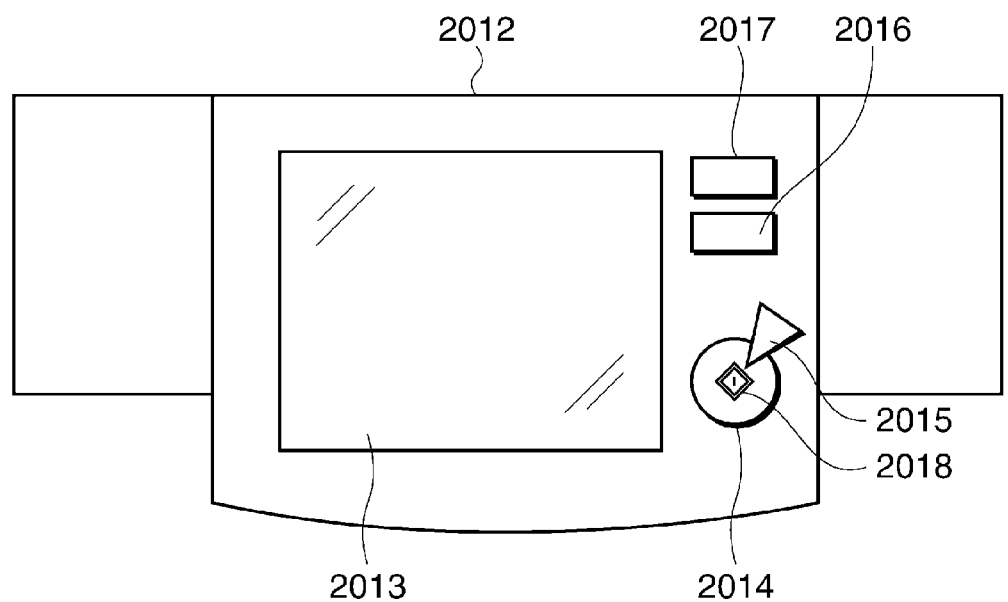
FIG. 3 is a plan view showing the construction of an operation unit shown in FIG. 1.

FIG. 3 shows the construction of the operation unit 2012 in plane view.

The operation unit 2012 has an LCD display device 2013 having an LCD mounted with a touch panel sheet. The display device 2013 displays an MFP operation screen. When any of keys displayed on the operation screen is pressed, the LCD display device 2013 sends position information about the pressed key to the CPU 2001.

A start key 2014 is used to start an original image reading operation, for example. At the center of the start key 2014, there is provided a two-color LED 2018 with green and red that indicates whether the start key 2014 can be used. A stop key 2015 is used to stop an operation which is in execution.

An ID key 2016 is used to input a user ID, and a reset key 2017 is used to initialize the settings set up by the operation unit 2012.

Figure 4:
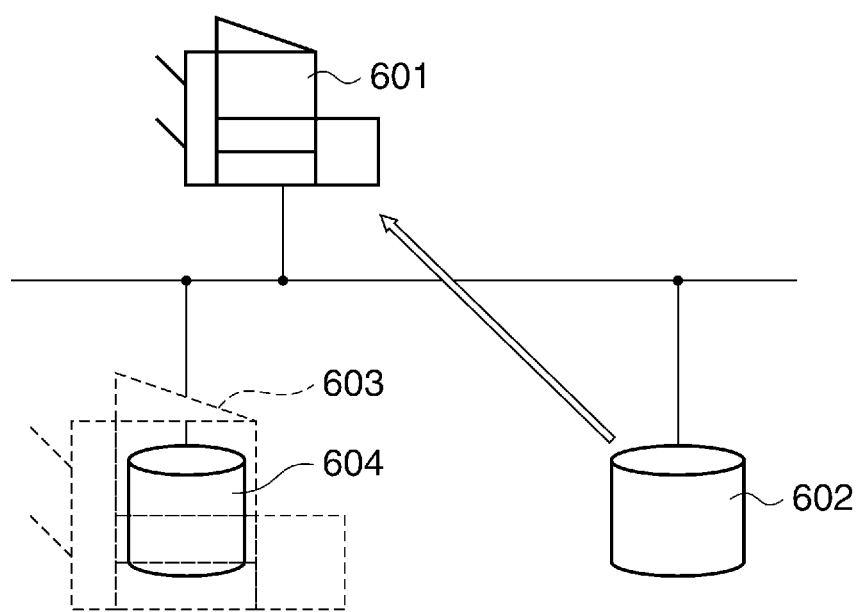
FIG. 4 is a view showing how a print job is executed by the MFP.

FIG. 4 shows how a print job is executed by the MFP.

Referring to FIG. 4, the MFP denoted by reference numeral 601 is connected through the network to a file server 602 and a personalized data server 603. To execute a print job, the MFP 601 reads print data from the file server 602 and performs printing according to the print data. Then, the MFP 601 stores information about the print data, print settings, and a printing result into a file 604 held in the personalized data server 603.

Figure 5:
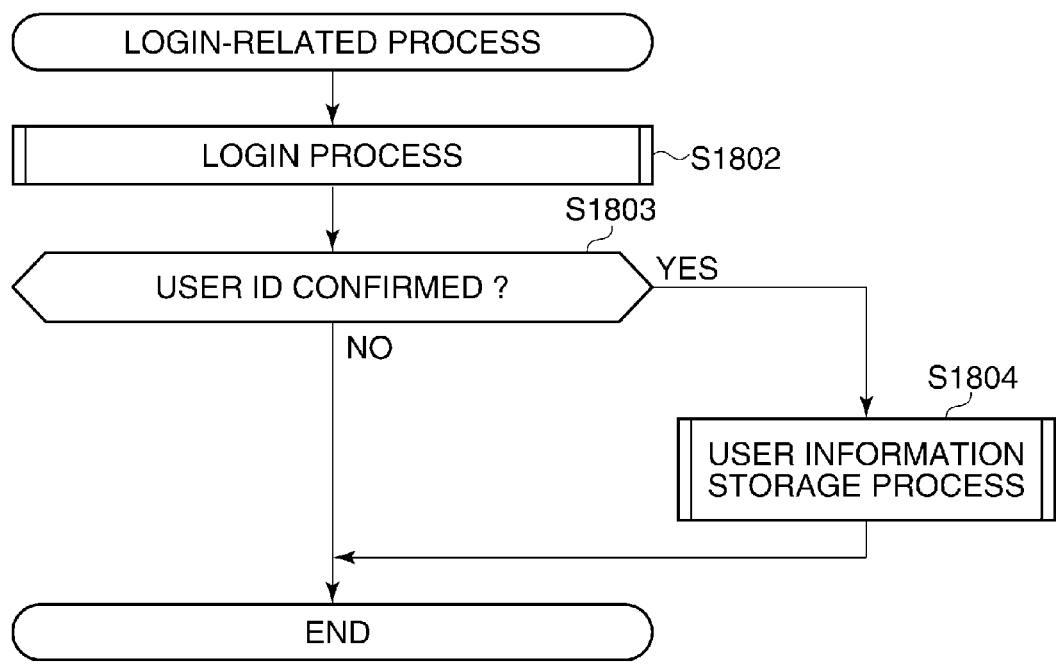
FIG. 5 is a flowchart showing an example of a login-related process performed by the MFP.

FIG. 5 shows in flowchart a login-related process performed by the MFP 601.

When receiving a login request from a user, the CPU 2001 of the controller unit 2000 of the MFP starts the login-related process. In the login-related process, the CPU 2001 reads IC card information and performs a login process (step S1802), and determines whether a user ID is confirmed in the login process (i.e., determines whether it is confirmed in the login process that the user ID is valid) (step S1803). If the user ID is confirmed (i.e., if YES to step S1803), the user ID is authenticated and the user is in a login state. Then, the CPU 2001 performs a user information storage process, described later (step S1804), and completes the present process.

On the other hand, if the user ID is not confirmed (i.e., if NO to step S1803), the CPU 2001 completes the present process. In that case, the user fails to log in.

FIG. 6 shows an example of a print job setting table.

The print job setting table shown in FIG. 6 is provided with an item field and a setting value field. In the item field, there are items of number of print copies, magnification, reduction layout, double-sided, and finishing. Further provided are items of data server, file name, user name, password, and transmission destination which are related to print data read from the file server 602, and items of color adjustment and printer magnification fine adjustment which are related to print image adjustment.

The setting value field is set with setting values of the respective items. In the illustrated example, the "number of print copies" item is set with a value of 10, the magnification item is set with a value of 100%, the double sided item is set with a value indicating double-sided printing, and the finishing item is set with a value indicating stapling at upper left corner. The reduction layout item is set with no value. The data server item is set with a value "¥¥security-server.com¥001," the file name item is set with a value "product development roadmap.xls," the user name item is set with a value "yoshida," and the password item is set with a value "password." The "print data transmission destination" item is set with no setting value. The color adjustment item is set with a value of −1 for cyan, 0 for magenta, +1 for yellow, and +2 for black. The "printer magnification fine adjustment" item is set with a value of 0.1%.

FIG. 7 shows an example of a job history list, which is displayed on the LCD display device 2013 of the operation unit 2012.

Referring to FIG. 7, the job history list includes items of date, type, job name, and result. In the items of each row of the list, execution date, job type, job name, and execution result of a corresponding job are indicated. For example, on the last row of the illustrated list, execution date: February 5, job type: print, job name: product development roadmap.xls, and execution result: OK are indicated.

Figure 8:
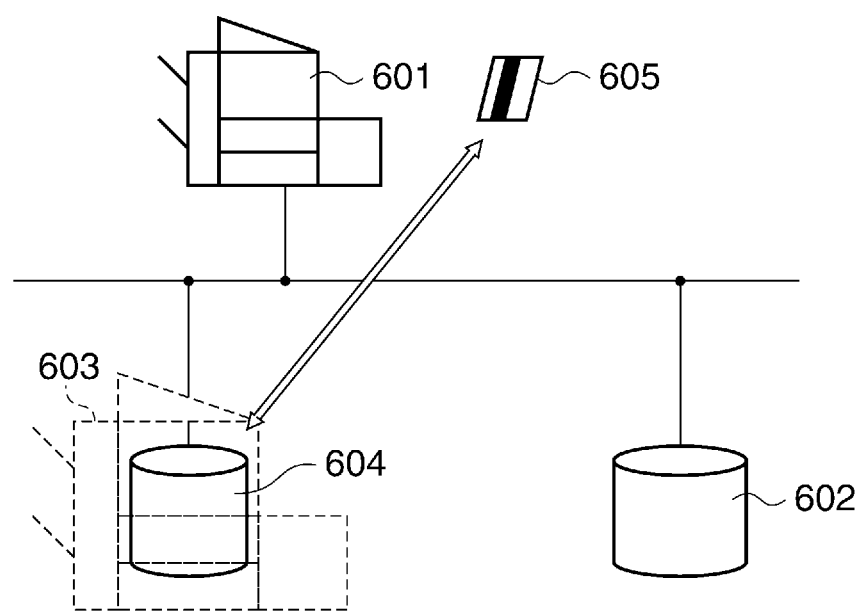
FIG. 8 is a view showing a security data storage process performed by the MFP.
Figure 9:
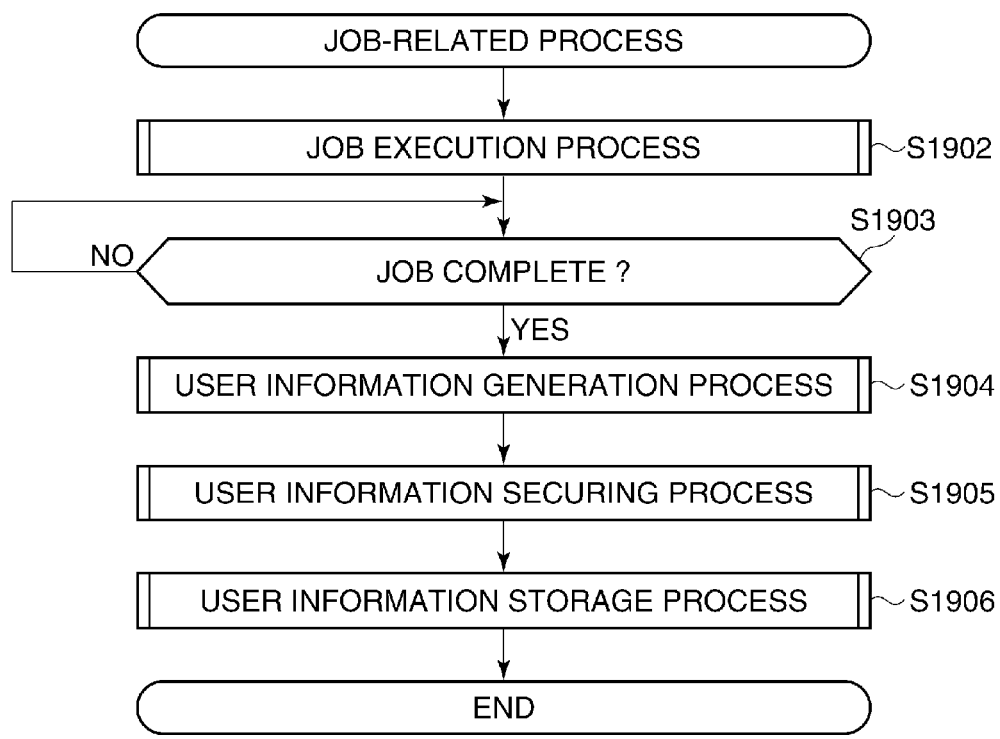
FIG. 9 is a flowchart showing a job-related process including the storage process shown in FIG. 8.

FIG. 8 shows a security data storage process performed by the MFP 610, and FIG. 9 shows in flowchart a job-related process including the storage process shown in FIG. 8.

After the login-related process of FIG. 5 is completed and a user logs in, the CPU 2001 of the MFP 601 starts the job-related process shown in FIG. 9. When receiving an instruction to execute a print job, the CPU 2001 performs a job execution process to thereby execute the print job (step S1902). Next, the CPU 2001 determines whether the print job is complete (step S1903).

If the answer to step S1903 is NO, the CPU 2001 waits for completion of the print job.

If the print job is complete (i.e., if YES to step S1903), the CPU 2001 executes a user information generation process, described later (step S1904). Then, the CPU 2001 executes a user information securing process (described later) to thereby remove security data from user information (step S1905). Next, the CPU 2001 executes a user information storage process (step S1906), and completes the job-related process.

In the user information storage process in step S1906, security data is stored into a personalized data server 603, the data server 603 sends link information back to the MFP 601, and the MFP 601 stores the link information (see, FIG. 8). In FIG. 8, reference numeral 602 denotes a file server, 604 denotes a file in the data server 603, and 605 denotes an IC card used by a user to log in the MFP 601.

Figure 10:
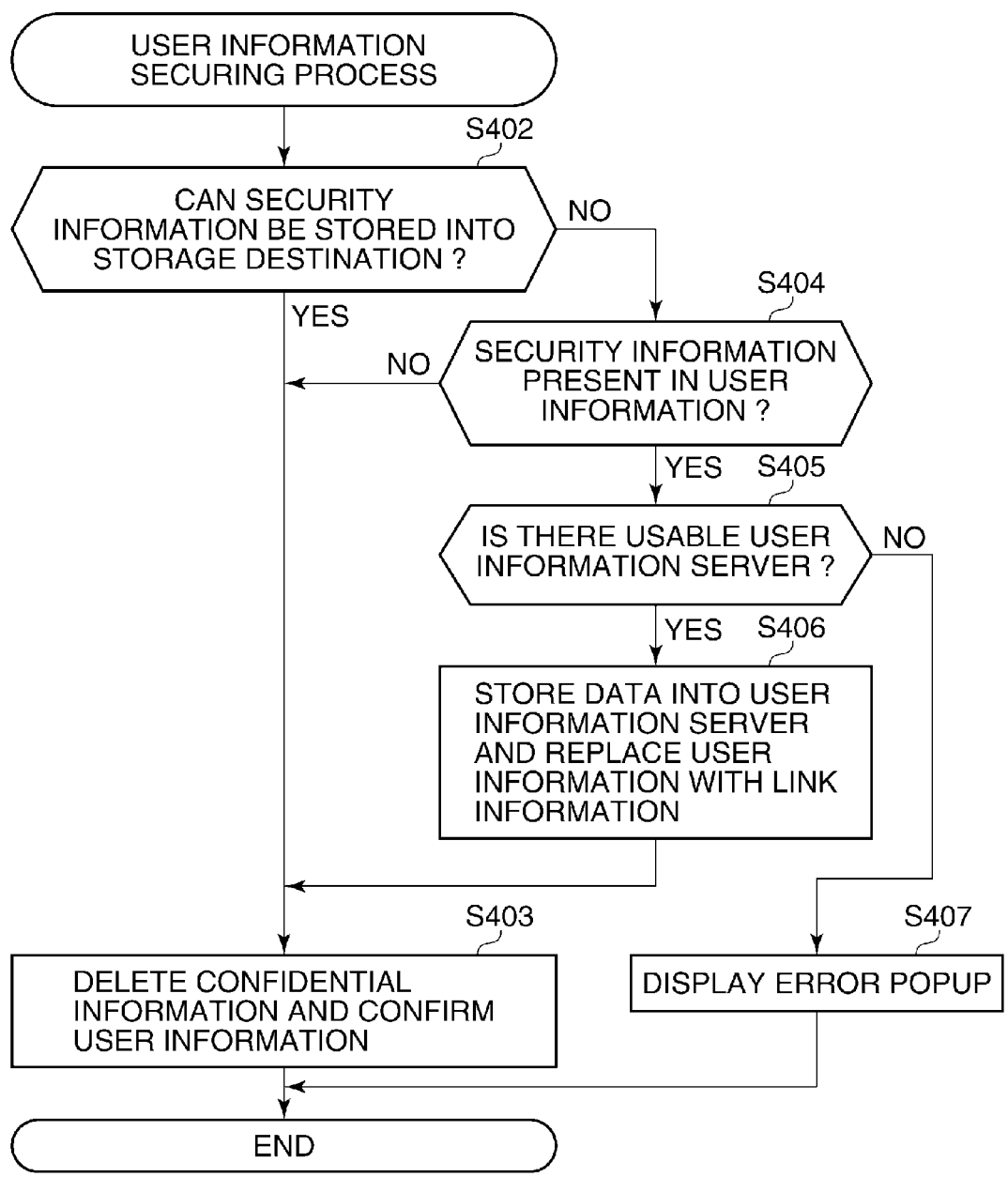
FIG. 10 is a flowchart showing a user information securing process executed in the job-related process shown in FIG. 9.

FIG. 10 shows in flowchart the user information securing process executed in step S1905 of the job-related process of FIG. 9, and FIG. 11 shows an example of a category table stored in, e.g., the ROM 2003 and showing a correspondence between storage units and category levels of information that can be stored into the storage units.

In the user information securing process of FIG. 10, the CPU 2001 determines whether security information is allowed to be stored into a destination storage unit based on the category table shown in FIG. 11 (step S402).

As shown in FIG. 11, the category table has a storage unit field and a category field. In the storage unit field, storage units are classified under the own apparatus (the HDD 2004 of the MFP 601), appliances in the same route as the own apparatus, storage appliances on the intranet to which the own apparatus is connected, USB storage media including the above-described USB memory and IC card, and storage appliances on the internet to which the own apparatus is connected. In the category field, category levels (secure category, general category, and prohibition category) for the storage units are indicated.

The category level for the own apparatus, appliances in the same route, and storage appliances on the intranet is the secure category. This indicates that information belonging to the general category and information belonging to the secure category (hereinafter, respectively referred to the general information and the security information) are allowed to be stored (can be stored) into these storage units. The category level for the USB storage media is the general category. This indicates that the general information is allowed to be stored into the USB storage media, but the security information is not allowed to be stored into the USB storage media. The category level for the storage appliances on the internet is the prohibition category. This indicates that the security information and the general information are not allowed to be stored into the storage appliances on the internet.

If the security information is allowed to be stored into a destination storage unit (i.e., if YES to step S402), the CPU 2001 deletes or removes confidential information from user information and confirms or accepts the user information (step S403).

On the other hand, if the security information is not allowed to be stored into the destination storage unit (i.e., if NO to step S402), the CPU 2001 determines whether security information is included (present) in the user information to be stored (step S404).

FIG. 12 shows an example of a user information template used for the security information determination in step S404 of FIG. 10.

As shown in FIG. 12, the user information template has an item field, information type field, setting item field, user information field, and category field.

In the item field of the user information template, there are items of job default settings, frequently-used job settings, job history (use status), address book, and screen customization settings.

The job default settings are initial job settings. The frequently-used job settings are ones in which settings of a frequently-used job are recallably registered. The job history is a history of an executed job. The address book is used to store a transmission destination. The screen customization settings are ones in which settings of a setting screen and settings of an information display screen are stored.

The following is a description of the job default settings item.

The job default settings are used to set job setting values. In the information type field of the job default settings, it is therefore indicated that a type of information relating to the job default settings is setting value information. In the setting item field of the job default settings, there are provided setting items of number of print copies, magnification, reduction layout, double-sided, finishing, data server, file name, user name, password, transmission destination, color adjustment, and printer magnification fine adjustment. These setting items are the same as those provided in the item field of the print job setting table shown in FIG. 6. By recalling the contents of these setting items, it is possible to reproduce the corresponding job.

In the user information field of the user information template, pieces of information (indicated by circle marks and cross marks) are set, each of which represents whether the corresponding setting item is a configuration item of user information. In the user information field of the job default settings, it is indicated by circle marks that setting items from the "number of print copies" item to the transmission destination item are configuration items of the user information, and it is indicated by cross marks that the color adjustment item and the printer magnification fine adjustment item are not configuration items of the user information.

In the category field of the user information template, categories of respective setting items are indicated. In the category field of the job default settings, the general category is set for the setting items from the "number of print copies" item to the finishing item, the color adjustment item, and the printer magnification fine adjustment item, whereas the secure category is set for the setting items of data server, file name, user name, and transmission destination. In a case where the user information template of FIG. 12 is used in the security information determination in the user information securing process shown in FIG. 10, it is determined in step S404 of FIG. 10 that security information is present in the user information.

In the category filed of the job default settings, a confidential category is set for the "password" setting item. On the other hand, the category levels indicated in the category table of FIG. 11 only include the secure category, general category, and prohibition category, and does not include the confidential category. This indicates that there are no storage units assigned for storing confidential information categorized into the confidential category. In other words, it is indicated that confidential information is not allowed to be stored into storage units shown in FIG. 11.

In the following, the frequently-used job settings item and the job history item are described. Setting items in these items are the same as those in the job default settings item. As with the job default settings, the frequently-used job settings and the job history are used to set job setting values. It is therefore indicated in the information type fields of the frequently-used job settings item and the job history item that a type of information relating to these items is setting value information.

The following is a description of the address book item. In the information type field of the address book, it is indicated that a type of information relating to the address book is address book information. In the setting item field of the address book, there are provided items of name, protocol, address, sub-address, and attribute information. The name is a letter string added to an address. The protocol represents a transmission protocol such as FAX or E-mail. The address is a letter string that represents an E-mail address or a FAX number. The sub-address is a letter string which is added to the protocol, where required. The attribute information is information representing counterpart's performance and settings at the time of transmission.

In the user information field of the address book, there are pieces of information (indicated by cross marks) representing that none of setting items are configuration items of the user information. In the category field of the address book, the security category is set for all the setting items.

The following is a description of the screen customization settings. In the information type field of the screen customization settings, it is indicated that a type of information relating to the screen customization settings is screen customization information. In the setting item field of the screen customization settings, there are provided items of user name, comment information, screen background image, and menu screen arrangement information. In the user information field of the screen customization settings, there are pieces of information (indicated by cross marks) representing that none of setting items are configuration items of the user information. In the category field of the screen customization settings, the general category is set for all the setting items.

Referring to FIG. 10 again, the user information securing process is further described. If it is determined that security information is present in the user information (i.e., if YES to step S404), the CPU 2001 determines whether there is a usable user information server (external apparatus) (step S405). In the example shown in FIG. 8, the CPU 2001 determines that the personalized data server 603 can be used as the user information server.

If there is a usable user information server (i.e., if YES to step S405), the CPU 2001 stores data (user information) into the user information server, and replaces the user information with link information (recording destination information) that represents a link destination (recording destination) (step S406), whereupon the process proceeds to step S403. The process also proceeds to step S403, if it is determined in step S404 by the CPU 2001 that security information is not present in the user information.

If there is no usable user information server (i.e., if NO to step S405), the CPU 2001 causes the operation unit 2012 to display an error popup thereon (step S407), and completes the process without confirming the user information.

In the following, the details of processing in step S406 of the user information securing process shown in FIG. 10 will be described.

In step S406 of FIG. 10, the CPU 2001 extracts, from the user information, security information which is determined in step S404 based on the user information template of FIG. 12 as being present in the user information. For example, information "¥¥security-server.com¥001¥", "product development roadmap.xls" and "yoshida" in the setting items of data server, file name, and user name in the user information are extracted as the security information.

Next, the CPU 2001 creates files based on the security information extracted from the user information.

FIG. 13 shows an example of files created based on the security information extracted from the user information. In the example of FIG. 13, a file having a file name ¥¥personalized-data-server¥yoshida¥0315467-1 and registered with a value "¥¥security-server.com¥001" relating to the data server item of the user information is created. Also created is a file having a file name ¥¥personalized-data-server¥yoshida¥0315467-2 and registered with a value "product development roadmap.xls" relating to the file name item of the user information. Further created is a file having a file name ¥¥personalized-data-server¥yoshida¥0315467-3 and registered with a value "yoshida" relating to the user name item of the user information.

Next, the CPU 2001 corrects the user information on the basis of the files created based on the security information extracted from the user information. FIG. 14 shows an example of the user information corrected according to the files shown in FIG. 13. As shown in FIG. 14, setting values in the data server item, file name item, and user name item of the user information are corrected, whereby the user information is updated. The CPU 2001 stores the updated user information into the HDD 2004. Since the security information in the user information shown in FIG. 14 cannot directly be referred to, the security of the security information can be improved.

FIG. 15 shows an example of the user information stored in the HDD 2004.

Referring to FIG. 15, an item field, data entry field, creation date field, and creation apparatus field are provided in the user information. The user information is comprised of a plurality of records. In the item field of each record, one of job default settings, frequently-used job settings, job history, address book, and screen customization settings is indicated. In the data entry field of each record, a storage location of record data is indicated. In the creation date field, record creation date is indicated. In the creation apparatus field, information representing an apparatus by which data was created is indicated.

The first record indicates that job default settings are stored therein, record data is stored at a storage location ".¥default¥yoshida0000", and data was created on Dec. 9, 2009 by an apparatus whose IP address is 192. 168. 003. 123.

The second record indicates that frequently-used job settings are stored therein, record data is stored at a storage location ". ¥jobset¥yoshida0000", and data was created on Dec. 9, 2009 by the apparatus shows IP address is 192. 168. 003. 123.

The fifth record indicates that screen customization settings are stored therein, record data is stored at a storage location ".¥custom¥yoshida0000", and data was created on Dec. 9, 2009 by the apparatus whose IP address is 192. 168. 003. 123.

The sixth record indicates that a job history is stored therein, record data is stored at a storage location ".¥joblist¥yoshida0000", and data was created on Dec. 9, 2009 by the apparatus whose IP address is 192. 168. 003. 123.

As described above, data are registered and accumulated in the user information in the order in which these data were created.

FIG. 16 shows in flowchart an example of a user information generation process performed by the MFP.

The user information generation process is performed in step S1904 of the job-related process shown in FIG. 9.

In the user information generation process, the CPU 2001 acquires the user information template stored in the ROM or the HDD, and creates temporary user information based on the user information template (step S1601).

Next, the CPU 2001 determines whether the setting items of the job default settings are configuration items of the user information based on pieces of information in the user information field of the job default settings of the user information template (step S1602). If one or more pieces of information each representing that the setting item is a configuration item of the user information are present in the user information field, the CPU 2001 determines that the setting items of the job default settings are configuration items of the user information. In the case of the example user information template shown in FIG. 12, plural pieces of information (shown by circle marks) each representing that the setting item is a configuration item of the user information are present in the user information field of the job default settings. Therefore, the CPU 201 determines in step S1602 that the setting items of the job default settings are configuration items of the user information.

When determining that the setting items of the job default settings are configuration items of the user information (i.e., if YES to step S1602), the CPU 2001 writes job default setting values into the temporary user information (step S1603), and proceeds to step S1604. On the other hand, if the answer to step S1602 is NO, the process proceeds to step S1604.

In step S1604, the CPU 2001 determines whether the setting items of the frequently-used job settings are configuration items of the user information. If the answer to step S1604 is NO, the process proceeds to step S1606. On the other hand, if the answer to step S1604 is YES, the CPU 2001 writes frequently-used job setting values into the temporary user information (step S1605), and determines whether the setting items of the job history are configuration items of the user information (step S1606). If the answer to step S1606 is NO, the process proceeds to step S1608.

On the other hand, when determining that the setting items of the job history are configuration items of the user information (i.e., if YES to step S1606), the CPU 2001 writes the job history into the temporary user information (step S1607), and determines whether the setting items of the address book are configuration items of the user information (step S1608). If the answer to step S1608 is NO, the process proceeds to step S1610.

If the setting items of the address book are configuration items of the user information (i.e., if YES to step S1608), the CPU 2001 writes the address book into the temporary user information (step S1609), and determines whether the setting items of the screen customization settings are configuration items of the user information (step S1610). If the answer to step S1610 is NO, the process proceeds to step S1612.

When determining that the setting items of the screen customization settings are configuration items of the user information (i.e., if YES to step S1610), the CPU 2001 writes the setting values of the screen customization settings into the temporary user information (step S1611).

In the user information field of the user information template shown in FIG. 12, it is indicated by cross marks that none of the setting items of the address book and the screen customization settings are configuration items of the user information. Thus, the CPU 2001 determines that the setting items of the address book and the screen customization settings are not configuration items of the user information, and does not write the setting values of the address book and the screen customization settings into the temporary user information.

In step S1612, the CPU 2001 writes the temporary user information into the item field, data entry field, creation date field, and creation apparatus field (see FIG. 15) of a new record, thereby merging the temporary user information into the user information shown in FIG. 15.

Figure 17:
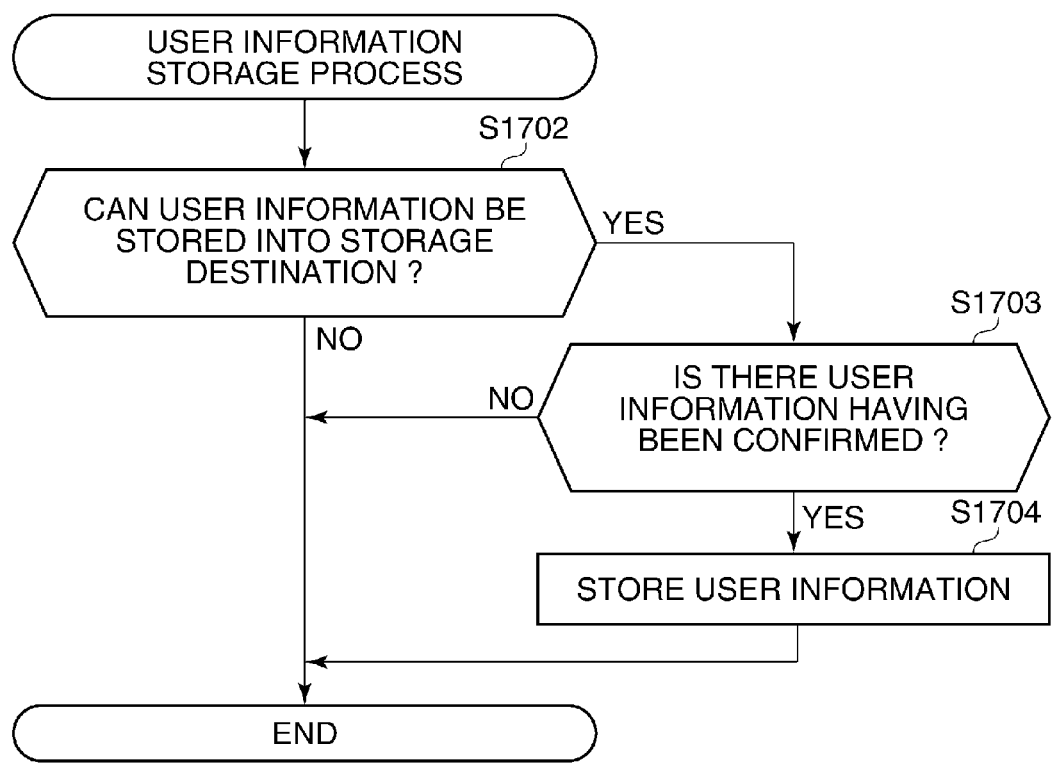
FIG. 17 is a flowchart showing an example of a user information storage process performed by the MFP in the job-related process shown in FIG. 9.

FIG. 17 shows in flowchart an example of a user information storage process performed by the MFP.

The user information storage process is performed in step S1804 of the login-related process and in step S1906 of the job-related process, which are already described referring to FIGS. 5 and 9.

In the user information storage process, the CPU 2001 confirms whether the user information can be stored into a specified destination storage unit (step S1702). When determining in step S1702 that the user information can be stored into the destination storage unit, the CPU 2001 confirms whether there is user information that has been confirmed in step S403 of the user information securing process shown in FIG. 10 (step S1703).

If there is any confirmed user information (i.e., if YES to step S1703), the CPU 2001 stores the user information into the specified destination storage unit (step S1704), and completes the user information storage process. If the answer to step S1702 or S1703 is NO, the user information storage process is completed.

In the following, a description will be given of how the user information is reproduced when the user logs in the MFP by using the IC card 605 (FIG. 8) recorded with the user information shown in FIG. 15.

When the user logs in, the CPU 2001 reads from the IC card 605 the last row record of the user information described referring to FIG. 15, thereby obtaining, e.g., the user information shown in FIG. 14. Based on the read user information, the CPU 2001 reproduces print settings. More specifically, as shown in FIG. 14, the CPU 2001 sets the number of print copies to 10, sets the magnification to 100%, does not set the reduction layout, sets the double-sided printing, and sets the finishing (stapling at upper left corner).

As shown in FIG. 14, there is a setting value ¥¥personalized-data-server¥yoshida¥0315467-1 in the data server item of the user information read from the IC card 605. The CPU 2001 acquires from the user information server (personalized server 603) a file having a file name indicated by this setting value.

As shown in FIG. 13, the file having the file name "¥¥personalized-data-server¥yoshida¥0315467-1" is registered with a value of ¥¥security-server.com¥001. By using this registered value as the setting value in the data server item, it is possible to reproduce the setting value "¥¥security-server.com¥001" in the data server item of the print job settings shown in FIG. 6.

The CPU 2001 also acquires from the server a file having a file name indicated by the setting value ¥¥personalized-data-server¥yoshida¥0315467-2 in the file name item of the user information shown in FIG. 14. By using a value "product development roadmap.xls" registered in that file, the setting value "product development roadmap.xls" in the filename item of the print job settings can be reproduced. The CPU 2001 acquires from the server a file having a file name indicated by the setting value ¥¥personalized-data-server¥yoshida¥0315467-3 in the user name item of the user information shown in FIG. 14. By using a value "yoshida" registered in that file, the setting value "yoshida" in the user name item of the print job settings can be reproduced.

In the following, a description will be given of how the user information is reproduced in a case that the MFP is in a stand alone environment where the MFP cannot access the user information server (personalized data server 603) shown in FIG. 8.

When the user logs in, the CPU 2001 reads from the IC card 605 the last row record of the user information described referring to FIG. 15 and obtains e.g., the user information shown in FIG. 14. Based on the read user information, the CPU 2001 reproduces the print settings. More specifically, the CPU sets the number of print copies to 10, sets the magnification to 100%, does not set the reduction layout, sets the double-sided printing, and sets the finishing (stapling at upper left corner), as shown in FIG. 14.

Next, the CPU 2001 attempts to acquire from the user information server (personalized server 603) a file having a file name indicated by the setting value ¥¥personalized-data-server¥yoshida¥0315467-1 in the data server item of the user information read from the IC card 605. However, the CPU 2001 cannot access the user information server and hence cannot acquire the file from the server.

Also, the CPU 2001 cannot acquire, from the user information server, a file having a file name indicated by the value "¥¥personalized-data-server¥yoshida¥0315467-2" set in the file name item of the user information read from the IC card 605 and a file having a file name indicted by the value "¥¥personalized-data-server¥yoshida¥0315467-3" set in the user name item of the user information.

As described above, if the files indicated by the setting values in the user information cannot be acquired from the user information server, the job settings cannot be reproduced by using values registered in these files as the job setting values. In that case, the CPU 2001 regards that there are no information relating to these setting values.

FIG. 18 shows an example of a job history list obtained as a result of execution of print jobs in the stand alone environment. In the stand alone environment, execution dates, types, and execution results of jobs are indicated in the job history list, but job names are not indicated in the list, as shown in FIG. 18.

FIG. 19 shows an example of a message displayed when a job is selected by a user from the job history list shown in FIG. 18.

As shown in FIG. 19, when a job is selected in the stand alone environment, a message "There is unreproducible information. Do you want to make loading?" is displayed together with a cancel button and an OK button.

When the OK button is pressed, only reproducible information (setting values in the items of the number of print copies, magnification, reduction layout, double-sided, and finishing in the job settings) are reproduced. In other words, even in the stand alone environment, the basic settings of the job settings can be reproduced and used.

(Second Embodiment)

Ina second embodiment of this invention, security information is deleted or removed from the user information by a user information securing process in a case where the user information is stored into a destination storage unit incapable of storing the security information.

Figure 20:
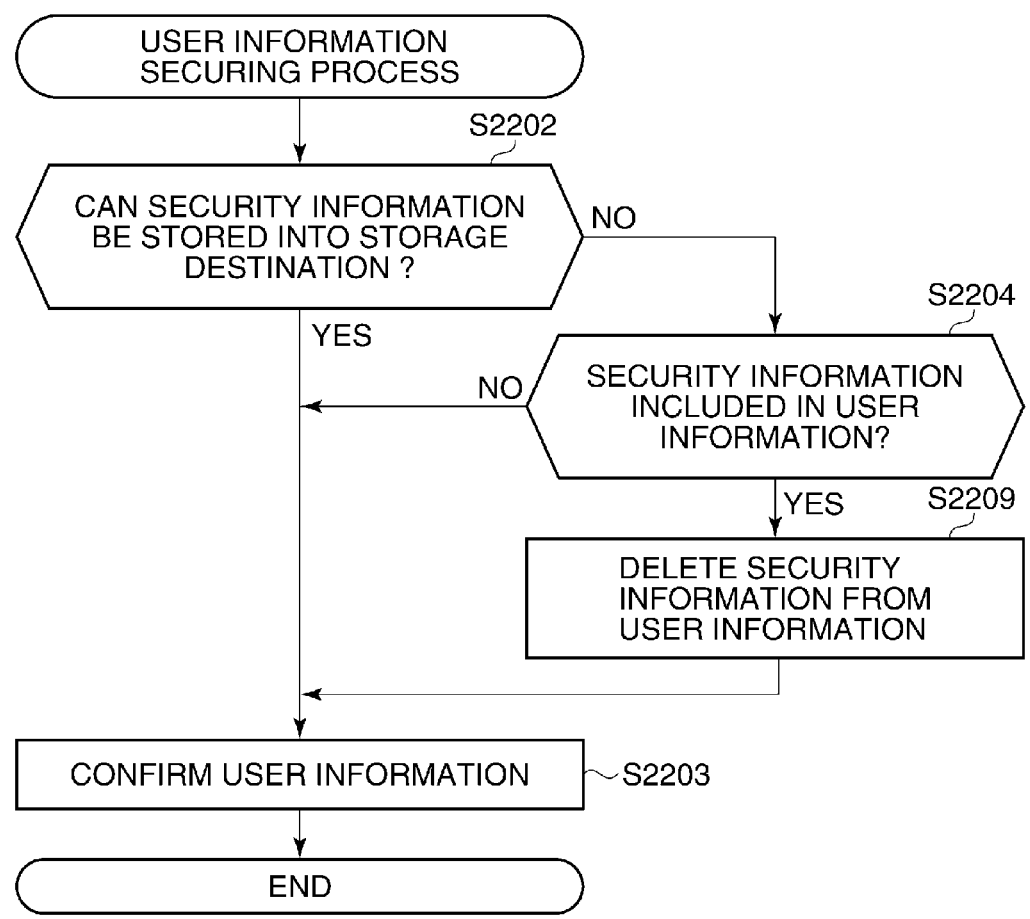
FIG. 20 is a flowchart showing an example of a user information securing process in a second embodiment of this invention.

FIG. 20 shows in flowchart an example of the user information securing process in the second embodiment.

In the user information securing process of FIG. 20, the CPU 2001 determines based on the category table shown in FIG. 11 whether security information can be stored into a destination storage unit (step S2202). If security information can be stored into the destination storage unit (i.e., if YES to step S2202), the CPU 2001 confirms the user information (step S2203).

On the other hand, when determining that security information cannot be stored into the destination storage unit (i.e., if NO to step S2202), the CPU 2001 determines whether security information is included in the user information to be stored (step S2204). When determining that there is security information in the user information (i.e., if YES to step S2204), the CPU 2001 deletes the security information from the user information (step S2209), and proceeds to step S2203.

When determining that there is no security information in the user information (i.e., if NO to step S2204), the CPU 2001 proceeds to step S2203. In step S2203, the user information is confirmed as previously described. Then, the user information securing process is completed.

FIG. 21 shows an example of the user information after the user information securing process of FIG. 20 is performed.

As with the user information shown in FIG. 14, items of the number of print copies, magnification, reduction layout, double-sided, finishing, data server, file name, user name, password, and transmission destination are provided in the user information shown in FIG. 21, and setting values are set in these items. However, setting values relating to data server, file name, and user name, which are secure information, are deleted and set to be non.

(Third Embodiment)

Figure 22:
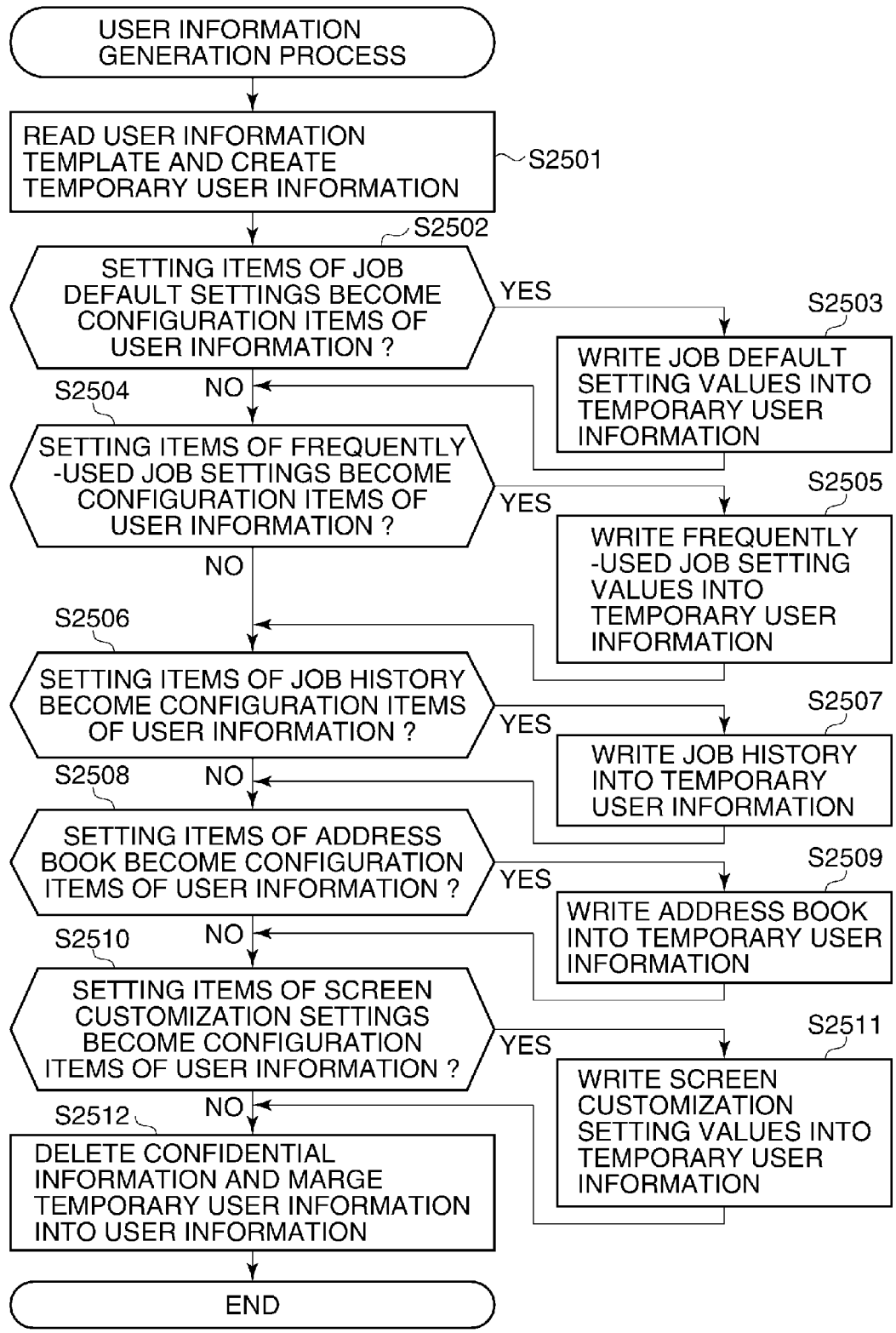
FIG. 22 is a flowchart showing an example of a user information generation process performed by the MFP in a third embodiment of this invention.

FIG. 22 shows in flowchart an example of a user information generation process performed by the MFP in a third embodiment of this invention.

The user information generation process shown in FIG. 22 is the same as the user information generation process of FIG. 16 except that temporary user information is merged to the user information in step S2512 after confidential information is deleted or removed from the temporary user information by the CPU 2001. The same processing as that in steps S1601 to S1611 of FIG. 16 is performed in steps S2501 to S2511 of the user information generation process of FIG. 22. Thus, a description of steps S2501 to S2511 is omitted.

In step S2512, prior to merging the temporary user information to the user information, the CPU 2001 classifies the setting values having been written into the temporary user information in one or ones of steps S2503, S2505, S2507, and S2509 into general information which is lowest in security level, security information which is medium in security level, and confidential information which is highest in security level, and setting values belonging to the confidential information are deleted or removed from the temporary user information.

(Fourth Embodiment)

In a fourth embodiment of this invention, a login-related process described below is performed in a case where a user ID is not confirmed in a login process, e.g., in a case where a guest user logs in the MFP.

Figure 23:
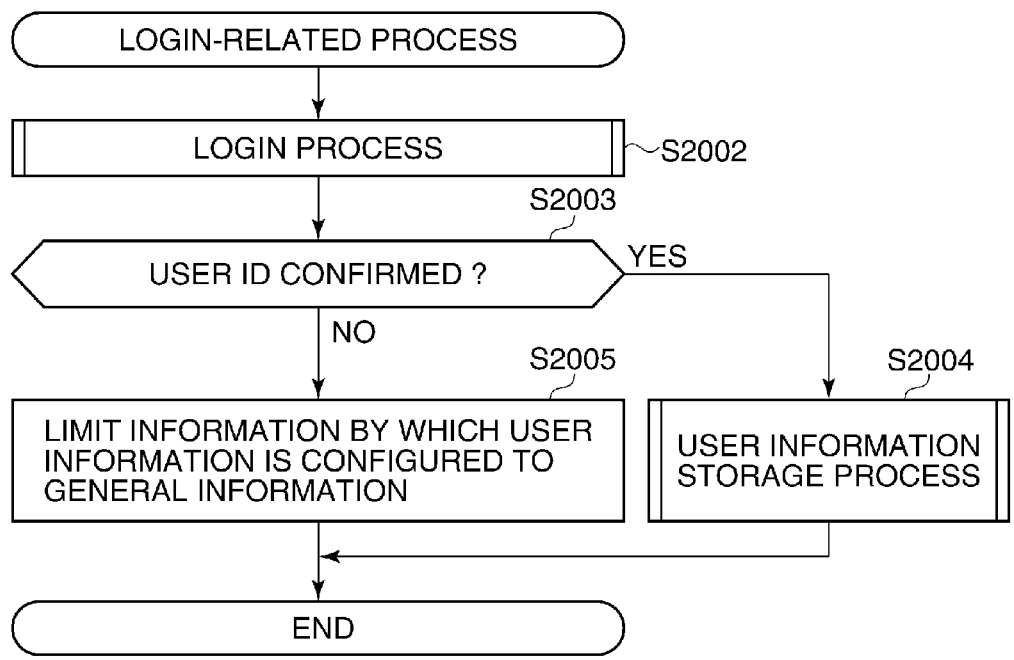
FIG. 23 is a flowchart showing an example of a login-related process in a fourth embodiment of this invention.

FIG. 23 shows in flowchart an example of the login-related process in the fourth embodiment.

When receiving a user's login request, the CPU 2001 of the MFP starts the login-related process. In the login-related process, the CPU 2001 performs a login process (step S2002), and determines whether a user ID is confirmed in the login process (step S2003). If a user ID is confirmed (i.e., if YES to step S2003), the CPU 2001 performs a user information storage process (step S2004), and then completes the login-related process.

On the other hand, if a user ID is not confirmed (i.e., if NO to step S2003), i.e., if the user is not authenticated, the CPU 2001 does not refuse the user's login, but permits the user to log in as a guest user whose user ID is unknown. When a guest user logs in, usable functions among the functions provided by the MFP 601 are limited. The CPU 2001 limits information, by which the user information is configured, only to general information (step S2005), and completes the login-related process.

As described above, if a user ID is not confirmed, the user information template is rewritten, so that security information setting items are not used to configure the user information.

FIG. 24 shows an example of a user information template used in the login-related process described referring to FIG. 23.

As compared to the user information template of FIG. 12, in the user information field of the user information template of FIG. 24, pieces of information (circle marks) representing that the setting items of data server, file name, user name, and transmission destination are configuration items of the user information are changed to information (cross marks) representing that these setting items are not configuration items of the user information.

As a result, when user information is generated while referring to the user information table, the security information setting item is not generated as user information. Thus, even a guest user or the like who does not have a user ID is capable of carrying on the settings of general information alone by using, e.g., a portable medium.

As apparent from the foregoing description, the CPU 2001 functions as a user information generation unit, first and second determination units, user information securing unit, security information recording unit, and user authentication unit, which are recited in the appended claims.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-172198, filed Jul. 30, 2010, which is hereby incorporated by reference herein in its entirety.

What is claimed is:

1. An image processing apparatus that performs an image processing job in which predetermined image processing is performed on an input image and a resultant image is output as an output image, comprising:
    a user information generation unit configured to generate user information about the image processing job;
    a first determination unit configured to determine according to predetermined recording medium categories whether security information can be stored into an external recording medium in a case where the user information is recorded into the external recording medium; and
    a user information securing unit configured, in a case where it is determined by said first determination unit that the security information cannot be stored into the external recording medium, to record into the external recording medium the user information from which predetermined security information is removed.

2. The image processing apparatus according to claim 1, wherein the user information at least includes customization settings about the image processing job or a use status of the image processing apparatus.

3. The image processing apparatus according to claim 1, including:
    a security information recording unit configured, in a case where it is determined by said first determination unit that the security information cannot be stored into the external recording medium, to record the security information into an external apparatus,
    wherein said user information securing unit records, into the external recording medium, recording destination information that specifies a recording destination of the security information, instead of recording the security information.

4. The image processing apparatus according to claim 3, wherein the external apparatus is on a network to which the image processing apparatus is connected.

5. The image processing apparatus according to claim 1, including:
    a second determination unit configured to determine whether there is the security information based on a user information template that specifies whether the user information includes the security information.

6. The image processing apparatus according to claim 5, wherein the user information includes a plurality of setting items, and
    said second determination unit classifies the setting items into general information which is lowest in level, the security information which is at security level, and confidential information which is highest in level.

7. The image processing apparatus according to claim 6, wherein in a case where it is determined by said second determination unit that any of the setting items is the confidential information, said user information securing unit deletes the confidential information from the user information and records resultant information into the external recording medium.

8. The image processing apparatus according to claim 6, wherein in a case where it is determined by said second determination unit that any of the setting items is the confidential information, said user information generation unit generates the user information from which the confidential information is removed.

9. The image processing apparatus according to claim 1, including:
    a user authentication unit configured to authenticate a user,
    wherein in a case where the user is not authenticated by said user authentication unit, even if it is determined by said first determination unit that the security information can be stored into the external recording medium, said user information securing unit records into the external recording medium the user information from which the security information is removed.

10. A control method for an image processing apparatus that performs an image processing job in which predetermined image processing is performed on an input image and a resultant image is output as an output image, comprising:
    a user information generation step of generating user information about the image processing job;
    a determination step of determining according to predetermined recording medium categories whether security information can be stored into an external recording medium in a case where the user information is recorded into the external recording medium; and
    a user information securing step, in a case where it is determined in said determination step that the security information cannot be stored into the external recording medium, of recording into the external recording medium the user information from which predetermined security information is removed.

11. A non-transitory computer-readable recording medium storing a program for causing a computer to execute the control method as set forth in claim 10.

* * * * *